US008554045B2

(12) United States Patent
Brooking et al.

(10) Patent No.: US 8,554,045 B2
(45) Date of Patent: Oct. 8, 2013

(54) DOCKING STATION FOR PORTABLE ENTERTAINMENT DEVICES

(75) Inventors: Eric Brooking, San Diego, CA (US); William A. McCarty, San Diego, CA (US); Yadir Rodriguez, San Ysidro, CA (US); Jeff King, Jr., San Diego, CA (US); Jim Wei, San Diego, CA (US)

(73) Assignee: KSC Industries Incorporated, Chula Vista, CA (US)

( * ) Notice: Subject to any disclaimer, the term of this patent is extended or adjusted under 35 U.S.C. 154(b) by 1683 days.

(21) Appl. No.: 11/273,616

(22) Filed: Nov. 14, 2005

(65) Prior Publication Data

US 2006/0127034 A1    Jun. 15, 2006

Related U.S. Application Data

(60) Provisional application No. 60/627,792, filed on Nov. 12, 2004.

(51) Int. Cl.
| | |
|---|---|
| *H04N 5/765* | (2006.01) |
| *H04N 9/80* | (2006.01) |
| *H04N 5/93* | (2006.01) |
| *G11B 27/00* | (2006.01) |

(52) U.S. Cl.
USPC ........... 386/200; 386/231; 386/234; 386/239; 386/248; 386/278; 386/358

(58) Field of Classification Search
USPC ....... 386/46, 95, 96, 118, 200–232, 239–248, 386/234, 278, 353–357, 358–362; 725/141
See application file for complete search history.

(56) References Cited

U.S. PATENT DOCUMENTS

| | | | | | |
|---|---|---|---|---|---|
| 5,323,234 | A | * | 6/1994 | Kawasaki | 725/141 |
| 5,933,430 | A | * | 8/1999 | Osakabe et al. | 370/463 |
| 6,233,002 | B1 | | 5/2001 | Shibayama | |
| 6,496,122 | B2 | * | 12/2002 | Sampsell | 340/825.69 |
| 6,608,907 | B1 | | 8/2003 | Lee | |
| 6,798,647 | B2 | * | 9/2004 | Dickie | 361/683 |
| 6,882,299 | B1 | * | 4/2005 | Allport | 341/176 |
| 7,016,595 | B1 | * | 3/2006 | Ishino et al. | 386/230 |
| 7,072,569 | B2 | * | 7/2006 | Lakhansingh | 386/243 |
| 7,091,849 | B1 | * | 8/2006 | Henry | 340/538.12 |
| 7,483,538 | B2 | | 1/2009 | McCarty et al. | |
| 7,609,946 | B2 | * | 10/2009 | Schedivy | 386/200 |
| 8,380,041 | B2 | * | 2/2013 | Barton et al. | 386/230 |
| 2003/0174242 | A1 | * | 9/2003 | Carmi et al. | 348/376 |
| 2004/0058649 | A1 | * | 3/2004 | Grady | 455/42 |
| 2004/0131192 | A1 | * | 7/2004 | Metcalf | 381/1 |
| 2004/0223622 | A1 | | 11/2004 | Lindemann et al. | |
| 2004/0255325 | A1 | * | 12/2004 | Furui et al. | 725/61 |

* cited by examiner

*Primary Examiner* — Hung Dang
(74) *Attorney, Agent, or Firm* — Knobbe, Martens, Olson & Bear LLP

(57) ABSTRACT

A docking station is configured to receive media in the form of audio and/or video from a portable entertainment device. The docking station transmits the received media to a remote playing device via a wired, wireless, or powerline connection. The media may include a control signal associated with the audio and/or video to control the remote playing device. In certain embodiments, the remote playing device transmits control signals to the docking station to control the portable entertainment device. In certain embodiments, the docking station electrically charges the portable entertainment device.

36 Claims, 5 Drawing Sheets

DOCKING STATION FOR PORTABLE ENTERTAINMENT DEVICES

RELATED APPLICATIONS

This application claims the benefit of U.S. Provisional Application No. 60/627,792 entitled DOCKING STATION FOR PORTABLE ENTERTAINMENT DEVICES, filed on Nov. 12, 2004, which is hereby incorporated by reference in its entirety.

FIELD OF THE INVENTION

This invention relates to a docking station for use with handheld entertainment devices. More specifically, this invention relates to a docking station which connects to one or more devices for receiving audio/video and or control signals and transmitting the received signals to a remote playing device.

BACKGROUND OF THE INVENTION

Advances in audio and video technology have led to the increasing popularity of portable digital audio and video players. iPod is a brand of portable digital audio and video player designed and marketed by Apple Computer and offers a simple user interface designed around a central scroll wheel. Most iPod models store media on a built-in hard drive, while the smaller iPod shuffle and iPod nano use flash memory. Like most digital audio players, an iPod can serve as an external data storage device when connected to a computer. Groups of audio and video coding standards employed in such devices include MP3 (MPEG-1 Audio Layer 3), AAC (Advanced audio coding), and Windows Media Audio (WMA).

No longer constrained to home computers, cassette tapes, CDs, and TVs, many people now store a large percentage of their music and video on portable digital audio players while away from home. Of course, much audio and video is still stored and played while at the home, and many people must choose between using a desktop computer while in the home and a portable digital audio and video player while away, or using a portable digital audio and video player exclusively, even while at home. Both options present disadvantages. Owning and operating a computer and a portable digital audio and video player involves additional expense, as two systems must be purchased and maintained. A high level of inconvenience is also introduced in that the two systems must be updated, that is, any music or video files added on one must be transferred to the other.

SUMMARY OF THE INVENTION

The systems and methods of the present invention have several features, no single one of which is solely responsible for its desirable attributes. Without limiting the scope of this invention, its more prominent features will now be discussed briefly. After considering this discussion, and particularly after reading the section entitled "Detailed Description of the Preferred Embodiments" one will understand how the features of this invention provide several advantages to a portable digital audio and video players.

One aspect of the invention relates to a docking station system for a media source device. The system comprises a housing having an input connector configured to mate with a media output connector on a media source device and a first transmitter located proximate to the media source device when mated with the input connector and configured to transmit a received signal to a unit located remote from the housing.

Another aspect of the invention is an entertainment system that comprises a housing having an analog input configured to receive an analog signal from a media source device, a digital input configured to receive a digital signal from the media source device, and a transmitter located proximate to the media source device and configured to transmit the received signal. The entertainment system further comprises a unit located remote from the housing and having a receiver module configured to receive the transmitted signal and a power supply configured to power the unit. The entertainment system further comprises a remote playing device configured to receive the signal transmitted by the unit and broadcast the received signal.

Still another aspect of the invention is a method for distributing audio signals from a hand held device. The method comprises receiving a media signal from a media source device via a connector, transmitting the media signal from a docking station and over a first network, receiving the transmitted media signal at a location remote from the docking station, and providing the received media signal to a remote playing device via a second network.

BRIEF DESCRIPTION OF THE DRAWINGS

The above mentioned and other features will now be described with reference to the drawings of the present system. The shown embodiments are intended to illustrate, but not to limit the invention. The drawings contain the following figures.

DETAILED DESCRIPTION OF THE PREFERRED EMBODIMENTS

The following description and Figures describing the preferred embodiments are made to demonstrate various configurations of possible systems employing a docking station in accordance with the current invention. The embodiment illustrated is shown in use with an exemplary media source unit and remote playing device. This is not intended to limit the disclosed concepts to the specified embodiments or to usage with the illustrated devices. In addition, various systems will be described in the context of an exemplary docking station incorporating the described components and media communication protocols. Those of skill in the art will recognize that the protocols described are neither limited to any particular type of system, nor to the transmission of any particular type of media for every described aspect herein.

By using a portable digital audio and video player, a user can gain the advantage of a portable device without incurring the added expense and inconvenience associated with owning a portable player and home system. Such a solution, however, comes at a cost. Portable digital audio and video players were designed to be compact and portable. As a result, the design of portable digital audio and video player peripheral components, such as the ear buds, headphones, and screens, have moved away from the more preferred designs associated with home speakers and monitors to the less comfortable but more compact designs for portable digital audio and video player.

To assist in the description of these components of the docking station system, the term "media" refers to audio, video, data, control codes, and/or one or more combinations thereof. The docking station 1A can be used with a media source unit 20 such as a portable digital audio and video player that provides a multi-channel audio signal without an associated video signal. In certain embodiments, the media source unit 20 provides both an audio and a video signal. Examples of media source units 20 that can generate audio and/or video signals include a personal computer, digital video disk (DVD) player, a stereo receiver, MP3 player, compact disk (CD) player, digital audio tape (DAT), and the like.

Figure 5:
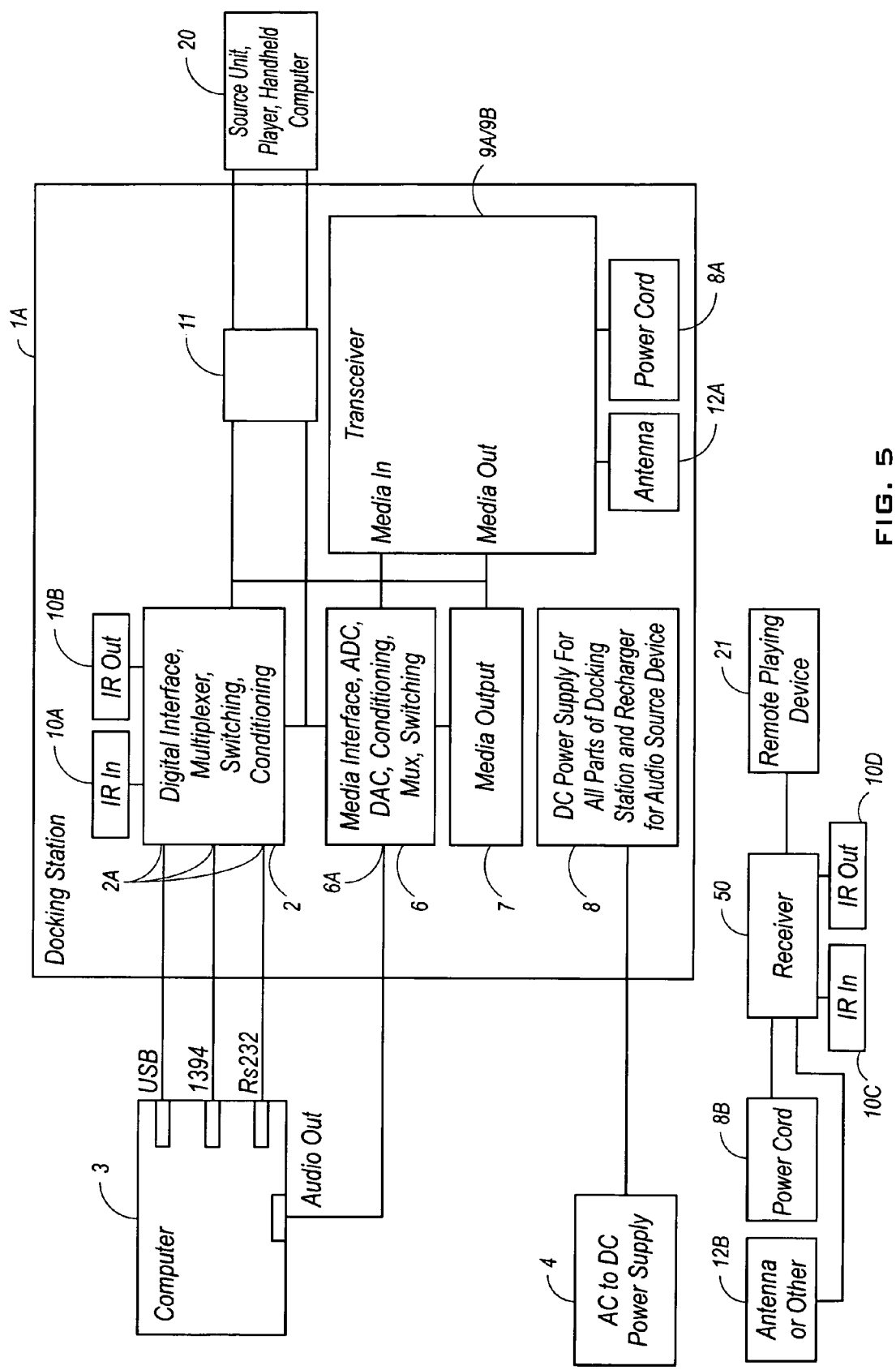
FIG. 5 illustrates a view of the docking station and media source unit from FIG. 2 transmitting media to a remotely located receiver and interfaced with a computer.

Instead of, or in addition to, providing an audio signal, certain embodiments of the docking station 1A provide a video signal to a TV, video display, or other display device for displaying the video signal. The display device can be connected directly to the docking station 1A, or indirectly to the docking station 1A via the wireless receiver (FIG. 5). However, as explained above, the invention is not limited to routing both audio and video signals.

Figure 1:
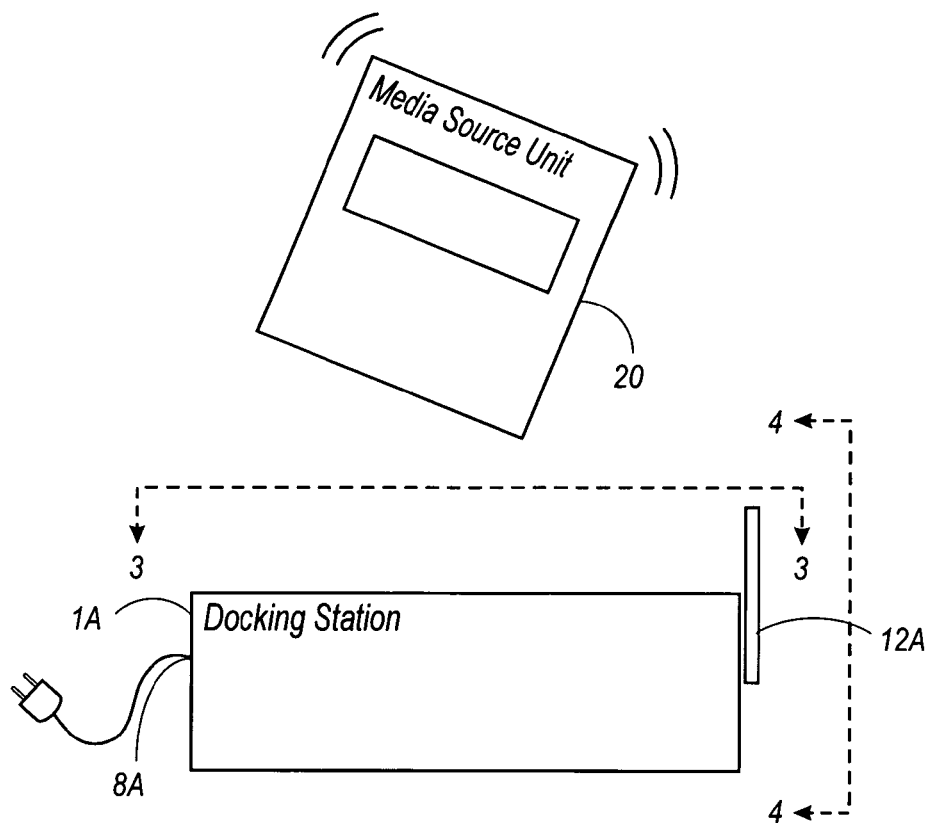
FIG. 1 illustrates a front view of an embodiment of a docking station for use with and disconnected from a media source unit.
Figure 2:
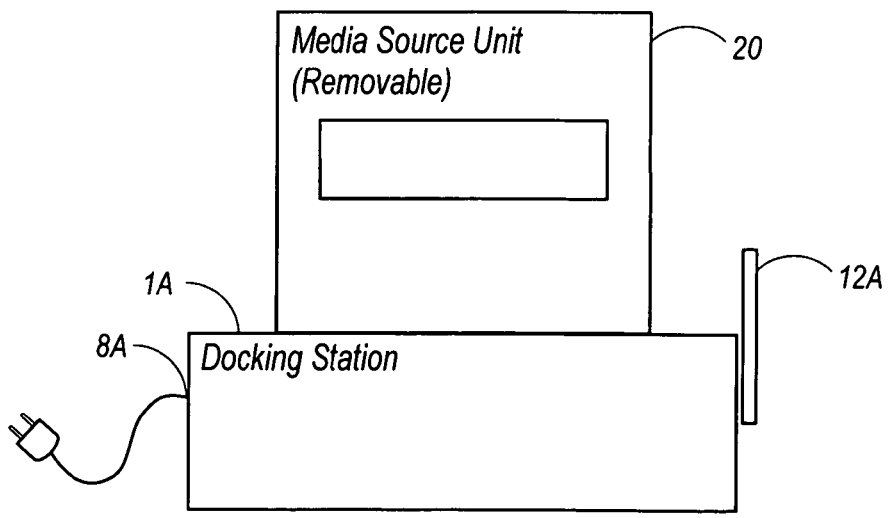
FIG. 2 illustrates the media source unit connected to the docking station of FIG. 1 for an audio application.

FIG. 1 illustrates a front view of an embodiment of a docking station 1A for use with and disconnected from a media source unit 20. Preferably, the docking station 1A is of comparable size as the media source unit 20. FIG. 2 illustrates the media source unit 20 connected to the docking station 1A to receive media from the media source unit 20 and distribute the received media to an audio device and/or video device for listening and/or viewing. The media source unit 20 in FIG. 1 is attached to the docking station 1A in FIG. 2 and preferably rests naturally and upright on the docking station 1A.

Figure 3:
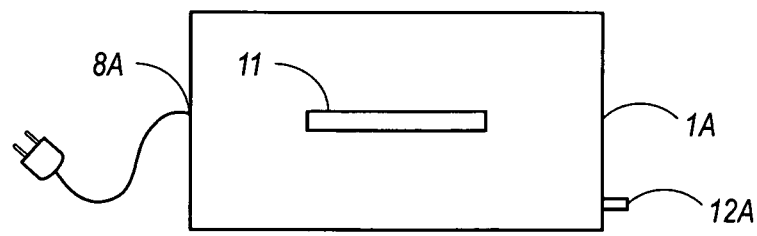
FIG. 3 illustrates a top view of the docking station of FIG. 1 showing a connector configured to connect with the media source unit.

FIG. 3 illustrates a top view of the docking station 1A of FIG. 1 showing a connector 11 configured to connect with a mating connector on the media source unit 20. The mating connectors are preferably integral to the media source unit 20 and the docking station 1A to provide mechanical support and also electrical communication when connected. The Connector 11 can protrude through an opening in the docking station 1A for connecting to the media source unit 20. The media source unit 20 can be wired or mounted directly on a printed circuit board (PCB) within the docking station 1A. The connector 11 can include one or more pins to transfer all media and power between the docking station 1A and the media source unit 20.

Preferably, the connector 11 is located on an exposed surface of the docking station 1A and accessible for a user to attach the media source unit 20. The connector 11 is configured to directly connect to a mating connector on the media source unit 20 without additional wires or hardware.

Figure 4:
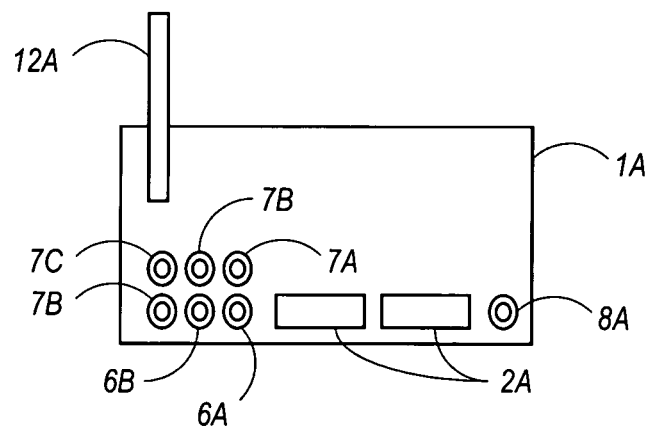
FIG. 4 illustrates a side view of the docking station of FIG. 1 showing media inputs and outputs.

FIG. 4 illustrates a side view of the docking station 1A showing media inputs and outputs 2A, 6A, 6B, 6C, 7A, 7B, 7C. Connector 6A is configured to connect to a stereo mini jack input. Connector 7A is configured to connect to a stereo mini jack output. The connector outputs 6B, 7B are configured for connecting to a receiver 50 via a wire. The connector inputs 6C, 7C are configured for connecting to the media source unit 20 via a wire. As explained below, the docking station 1A preferably includes a wireless transmitter or a wireless transceiver for transmitting the media received from the media source unit 20 to a receiver 50 wirelessly. In certain embodiments, the docking station 1A transmits the media via a transceiver and media outputs 6B, 7B to separate receiving units.

As illustrated in FIG. 4, only some types of the many types of connections between the docking station 1A and the media source unit 20 is shown. The illustrated media ports and protocols associated therewith are only exemplary. The docking station 1A may include more or less ports. The media input ports 6A, 6C, 7C can be used instead of, or in addition to, the connector 11 so as to receive media from the media source unit 20. For example, a mini jack output from the media source unit 20 can connect to the mini-jack input 6A via a wire connector. Other locations for the connector and ways to connect the docking station 1A and the media source unit 20 would be obvious to one having ordinary skill in the art.

In certain embodiments, the user inputs control signals that may be transmitted in either direction between the docking station 1A and the remote playing device 21 (FIG. 5). The docking station 1A or remote playing device 21 can perform signal level conditioning wherein graphic equalization, balance adjustment, fader adjustment, volume adjustment and other control signals are applied to the signal wirelessly broadcast to the remote playing device 21 or to the media source unit 20.

The docking station 1A can combine the audio signal with the one or more control signals. As mentioned above, an exemplary control signal is a desired volume level. The control signal can originate at the media source unit 20 or the docking station 1A via a user input. In certain embodiments, the docking station 1A converts the audio signal from its original format to a format required by a wireless transmitter. The docking station 1A processes the formatted data and feeds the data to an RF module. The RF module modulates and transmits over the air through an antenna along signal path.

The user can control the RF channel switching and issue remote control commands to the wireless receiver. These commands can include, for example, volume control. In certain embodiments, the user interfaces with the docking station 1A to control RF channel switching, volume control etc.

FIG. 5 illustrates a view of the docking station 1A and media source unit 20 from FIG. 2 transmitting media to a remotely located receiver 50 and interfaced with a computer 3. The illustrated embodiment of the docking station 1A comprises a digital interface 2, a media interface 6, a media output 7, a power cord 8A, and an antenna 12A.

Referring to FIGS. 4 and 5, connector 2A connects to the digital interface 2. Via connector 2A, the digital interface 2 further connects to one or more computers 3 via a USB, 1394, RS232, or the like protocol. The digital interface 2 can include a series of active or passive electronics known to one of ordinary skill in the art. These electronics may utilize one or more protocols for interfacing between the computer 3, docking station 1A, and/or media source device 20. The transmission method between the PC and the docking station include any that is known to one having ordinary skill in the art for PC to handheld device connections.

The digital interface 2 can include drivers, conditioning electronics, multiplexer, microprocessor or manual switching for selecting signals between connectors 2A, connector 11 and a PCB assembly. For example, the digital interface 2 can be a buss for transferring data from the computer 3 and source device 20. Alternatively, the digital interface 2 interfaces directly to the media interface 6 via connector 6A. In this embodiment, the data can be sent wirelessly via transceiver 9A/9B.

The media interface 6 connects to one or more connectors 6A, 6B, 6C with active or passive electronics mounted on the PCB assembly within the docking station 1A. The media interface 6 comprises an audio interface. In certain embodiments, the media interface comprises an audio interface and a video interface for receiving A/V media. The media interface 6 can include drivers, ADC's, DAC's, DSP, amplifiers, multiplexers or passive routing or switching. The media interface 6 is configured to accept analog or digital media from the computer 3 or source device 20. For example, the digital media can be routed from the computer 3 via the connector 2A through the digital interface 2. In another embodiment, the digital media is routed from the source device 20 through the connector 11 and through the digital interface 2.

The analog media can be routed from the source device 20 through the connector 11 and into the media interface 6. In certain embodiments, the source device 20 is plugged into the input connectors 6A or 6C to output media. The media source device 20 may also be connected through connector 6B to receive media. Analog media can also be routed from the computer 3 through connectors 6A, 6B or 6C. The analog media can be conditioned and/or routed to a transceiver 9A/9B, a media output 7, or both at the same time.

The media output 7 can be passive or active. The media output 7 may be amplified or not. The media output 7 allows playing of local devices from the docking station 1A wired through connectors 7A, 7B or 7C.

The transceiver 9A/9B is configured to send media wirelessly, wired, or via a power line to a receiver 50. The remotely located receiver 50 provides the received media to a remote playing device 21. The playing device 21 may include a stereo receiver, amplifier, powered speakers, television, monitor, computer or the like. For wireless applications, these devices are preferably not hardwired to the docking station 1A. Alternatively, the playing device 21 is hardwired to the docking station 1A so as to receive the media via a power line or other wired connection.

For wireless transmission, the transceiver 9A/9B can be configured to transmit the media to the receiver 50 via a wireless interface, such as an antenna 12A, or the like. For certain wired embodiments, the transceiver 9A/9B transmits the media via a power plug 8A or the like. The receiver 50 receives the wirelessly transmitted media via the wireless interface 12b. As explained above, the media transmitted in either direction between the receiver 50 and the transceiver 9A/9B can include control information. For example, control codes can be transmitted back to the docking station 1A. In certain embodiments, these control codes allow control of the media source unit 20 or computer 3 from the location of the remote playing device 21.

The control codes may be transmitted to the receiver 50 using a wireless protocol. Wireless protocols include, for example, RF, IR, and the like. The receiver 50 may further include a transmitter for transmitting signals back to the transceiver 9A/9B. The signals transmitted back to the transceiver 9A/9B may include data indicating the operational status of the receiver 50.

In certain embodiments, an IR remote control transmits a control signal to the IR in 10c. The receiver 50 sends the received control signal via IR emitter 10d or the antenna 12b to the transceiver 9A/9B. The docking station 1A routes the received control signal through the digital interface 2 and to the device to be controlled. For example, the controlled device may be the media source device 20 or the computer 3. The routing of the control signal can be through the interface connectors previously described or though the IR emitter 10b.

IR codes can also be sent in series through the IR receiver 10a, the digital interface 2, the transceiver 9A/9B, the receiver 50, and finally to the IR emitter 10d. The IR emitter 10d allows the user to control the remote playing device 21 from the location of the docking station 1A. The media can be played back from the remote playing device 21 through the receiver 50, to the transceiver 9A/9B, and through the media interface 6 or digital interface 2. Of course the control signals may be transmitted wirelessly in one or both directions between the docking station 1A and the receiver 50 via RF instead of IR.

The docking station 1A further includes an AC to DC power supply 4. The AC/DC power supply 4 can be a typical transformer/power supply. The transmitter or supply 4 may be mounted in a separate housing or it can also be include in the housing for the docking station 1A. For embodiments where the power supply 4 is included inside the docking station 1A, the AC to DC power supply 4 can be part of the AC power cord 8A. It should be noted in embodiments where the docking station 1A transmits media to the receiver 50 via a wired power line connection, the AC to DC power supply 4 and the antenna 12A can be combined. The AC to DC power supply 4 provides either AC or DC power to DC power supply 8 through connector 8a. In certain embodiments, the DC power supply 8 provides all regulation and power supply requirements for all the components of the docking station 1A. In certain embodiments, the DC power supply 8 comprises circuitry to recharge the media source device 20 via connector 11.

Figure 6:
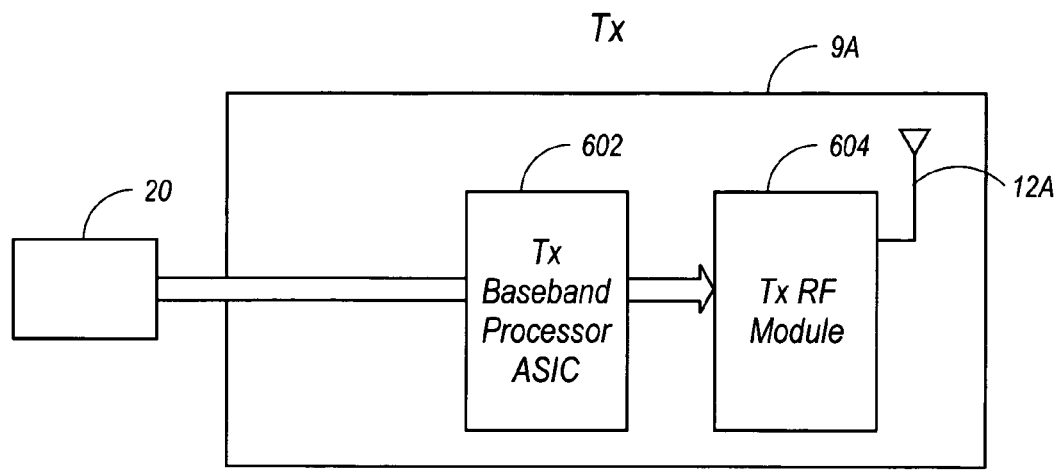
FIG. 6 is a block diagram of the wireless transmitter shown in FIG. 5.

FIG. 6 is a block diagram of a wireless transmitter 9A component of the transceiver shown in FIG. 5. The wireless transmitter 9A comprises a baseband processor 602 and an RF module 604. The wireless transmitter 9A receives the audio signal from the media source unit 20. The media source unit 20 and the wireless transmitter 9A can interface together via the connector 11, the digital interface, 2, and/or the media interface 6.

The wireless transmitter 9A can transmit a combined media signal with one or more control signals. As mentioned above, an exemplary control signal is a desired volume level. The control signal can originate at the media source unit 20 or the docking station 1A. The baseband processor 602 processes the media and feeds the media to the RF module 604. The RF module 604 modulates and transmits over the air through an antenna 12A along a signal path.

Figure 7:
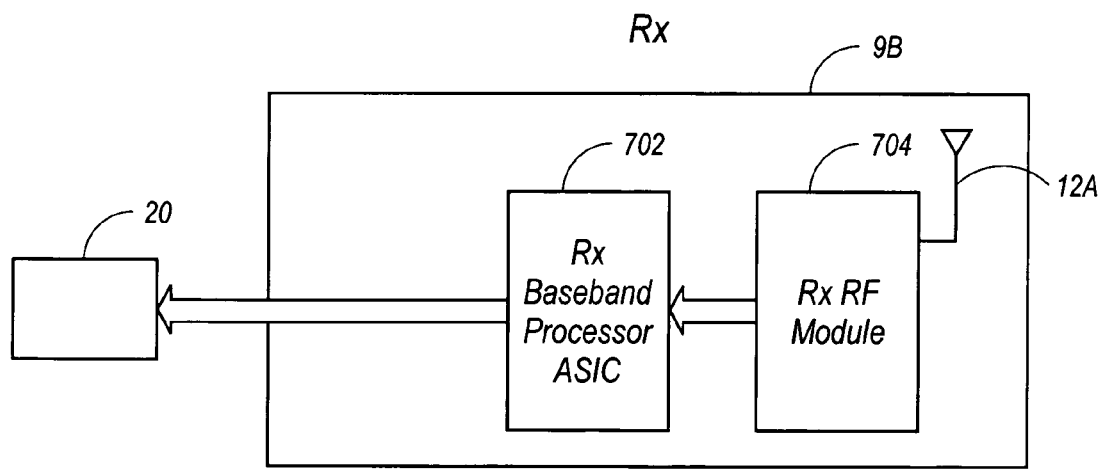
FIG. 7 is a block diagram of the wireless receiver shown in FIG. 5.

FIG. 7 is a block diagram of the wireless receiver 9B component of the transceiver shown in FIG. 5. The wireless receiver 9B comprises a baseband processor 702 and an RF module 704. The RF module 704 receives the audio signal via an antenna 12A and demodulates the received audio signal to a baseband signal. The baseband processor 702 extracts the control signal data from the baseband signal. The wireless receiver 9B provides the control signal to the media source unit 20.

Figure 8:
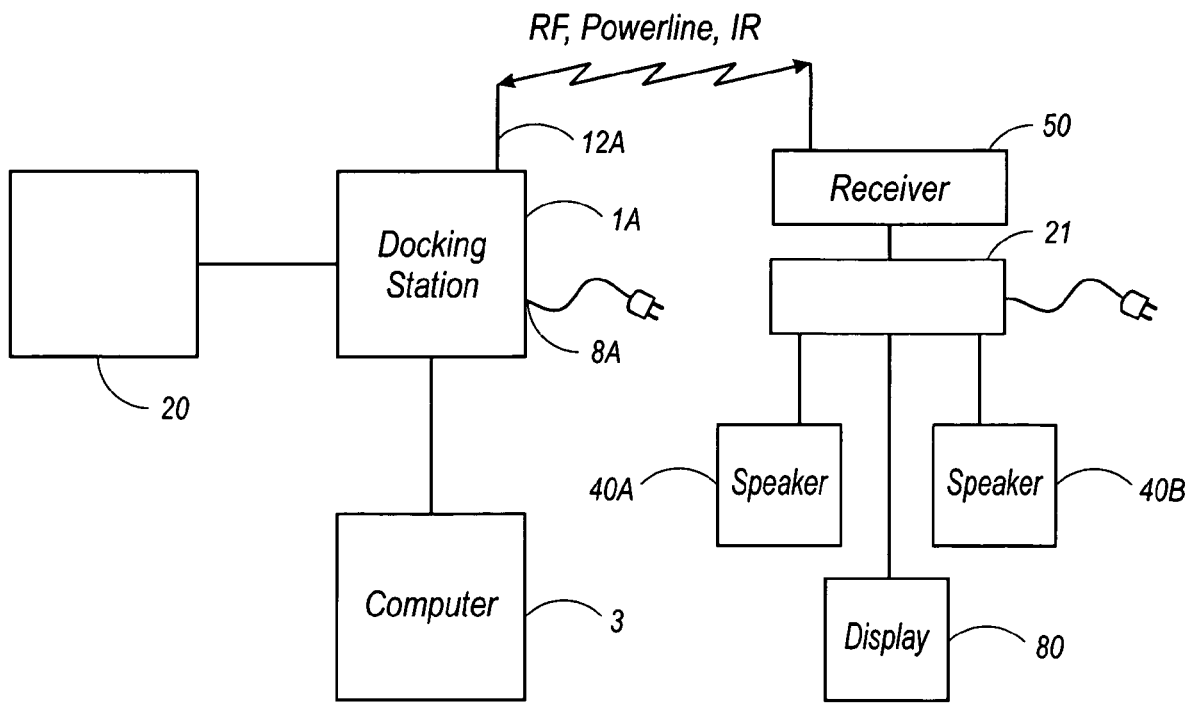
FIG. 8 illustrates an exemplary configuration that includes an MP3 player and computer connected to the docking station for transmitting media to a receiver via wireless, IR, RF, or powerline.

FIG. 8 illustrates an exemplary configuration that includes an MP3 player 20 and computer 3 connected to the docking station 1A for transmitting media to a receiver 50 via wireless, IR, RF, or powerline.

While docking stations exist for portable digital audio and video players, such as iPods and MP3 audio players and hand held computers, the traditional use is for battery charging and uploading/downloading data to the portable digital audio and video player from/to a computer. Traditional docking stations do not offer a convenient way to play media on remote devices or transfer media to other remote devices.

In certain embodiments, control signals are transmitted from the receiver 50 to the docking station 1A and control the MP3 player 20. The receiver 50 may be incorporated into a stereo receiver or other remote playing device 21. The receiver 50 further provides the media to an audio device, such as loudspeakers 40(a), 40(b) or the like. In certain embodiments, the media includes a video signal which the receiver 50 provides to the remote playing device 21 for display on a display 80.

An exemplary use of the docking station 1A is with an MP3 player, media players and handheld computers. The docking station 1a disclosed herein includes a digital interface 2 for data transfer from a computer 3 to a handheld device, media interface, power supply, battery-charger and wireless media transceiver. The docking station 1a can provide manual switching or multiplexer, so the appropriate function can be selected manually or automatically. The wireless transceiver 9A/9B can be bi-directional to send and receive media with the receiver 50.

The docking station 1A allows a user to charge their media source device 20, upload/download media and play media from their device 20 or computer 3 to one or more remote play devices 21, without the need to reposition the media source device 20 to another location. The transceiver 9A/9B, which combines the functionality of a receiver and a transmitter into a single device, sends media wirelessly to a like type receiver 50. The receiver 50 may include a receiver module similar to the receiver module 9B and/or a transmitter module similar to the transmitter module 9A. In certain embodiments, the receiver 50 plugs into a home entertainment system, a PC, stereo receiver, TV or have the receiver as part of a playback system. The playback system may include speakers 40a, 40b and or display 80. The docking station 1A may communicate with the receiver 50 and the receiver may communication with the docking station 1A via RF, Powerline, IR or other like technology.

Figure 9:
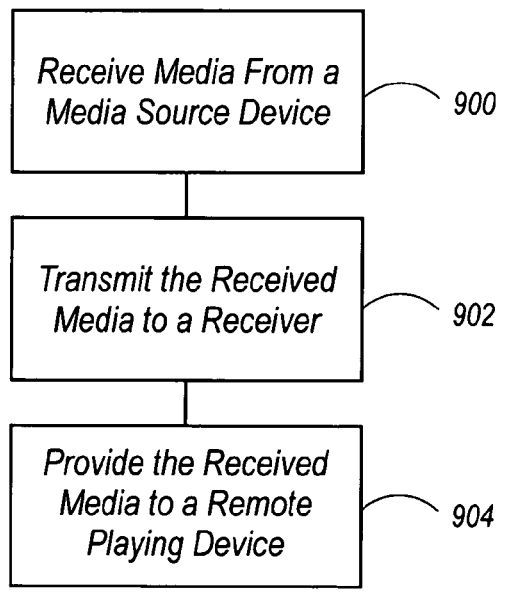
FIG. 9 is a flowchart of an exemplary process that is performed by the docking station illustrated in FIG. 1.

FIG. 9 is a flowchart of an exemplary process that is performed by the docking station 1A illustrated in FIG. 1. The process begins at a state 900 where a wireless transmitter 9A receives media including an audio signal from the media source device 20 via connector 11. The media source device 20 can be a MP3 or iPod player. Alternatively, the wireless transmitter 9A receives the audio signal directly from the media source device 20 via connectors 2A, 6A. The wireless transmitter 9A is located within a docking station 1A.

The process moves to a state 902 where the wireless transmitter 9A transmits the audio signal to a wireless receiver 50 located proximate to a remote playing device 21. The signal may further include control information. If control information is included with the signal, the receiver 50 can manipulate one or more audio channel based on the control signal. Next, at a state 904, the wireless receiver 50 provides the received audio channel to the remote playing device 21.

The various embodiments of the docking system, related devices, and protocols and techniques described above thus provide a number of ways to provide media to a remote playing device. In addition, the techniques described may be broadly applied for use with a variety of media transmission systems. It will be appreciated, however, that no matter how detailed the foregoing appears in text, the invention can be practiced in many ways. The embodiments of the transmitters/receivers herein disclosed can be fixed or modular in design. For example, a digital or common bus can be used. Examples of common bus designs include $I^2S$, $I^2C$, parallel, and serial.

It should be noted that the use of particular terminology when describing certain features or aspects of the present invention should not be taken to imply that the terminology is being re-defined herein to be restricted to including any specific characteristics of the features or aspects of the invention with which that terminology is associated. The scope of the present invention should therefore be construed in accordance with the appended claims and any equivalents thereof.

Of course, it is to be understood that not necessarily all such objectives or advantages may be achieved in accordance with any particular embodiment using the systems described herein. Thus, for example, those skilled in the art will recognize that the systems may be developed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments. Although these techniques and systems have been disclosed in the context of certain embodiments and examples, it will be understood by those skilled in the art that these techniques and systems may be extended beyond the specifically disclosed embodiments to other alternative embodiments and/or uses and obvious modifications and equivalents thereof. Thus, it is intended that the scope of the docking station 1A and systems disclosed herein should not be limited by the particular embodiments described above.

What is claimed is:

1. A docking station system for a media source device, the system comprising:
    a housing separate from the media source device, the housing comprising,
        a receptacle having a connector configured to mate with a media connector on the media source device, the receptacle solely supporting the media source device,
        a first transmitter located proximate to the media source device when mated with said connector and configured to transmit a received signal to a unit located remote from the housing,
        a receiver configured to receive a first control code from the remote unit, and
        a power supply configured to power the first transmitter and recharge the media source device while the housing is receiving the signal,
    wherein the remote unit comprises a second transmitter configured to transmit the first control code to the housing, wherein the housing directly controls the media source device via the connector based on the first control code, and wherein the media source device is solely coupled to the receptacle while the housing is receiving the signal from the media source device,
    wherein the first transmitter is further configured to transmit a second control code to the remote unit, said second control code being associated with the signal, and wherein the remote unit is further configured to modify the signal based on the second control signal.

2. The docking station system of claim 1, wherein the power supply comprises the first transmitter.

3. The docking station system of claim 1, wherein the second control code and the signal are transmitted using the same communication protocol.

4. The docking station system of claim 1, wherein the second control code and the signal are transmitted using different communication protocols.

5. The docking station system of claim 1, wherein the second control code is input to the housing.

6. The docking station system of claim 1, wherein the second control code is input to the housing a wireless protocol via a handheld remote control.

7. The docking station system of claim 1, wherein the second control code is input to the media source device.

8. The docking station system of claim 1, wherein the first control code is input via the unit.

9. The docking station system of claim 1, wherein the receiver is configured to wirelessly receive the first control code from a handheld remote control.

10. The docking station system of claim 1, wherein said connector is accessible through the housing and provides mechanical support to the media source device.

11. The docking station system of claim 10, wherein the connector has a plurality of pins, at least a first pin and a second pin being configured for attaching to the media source device, wherein the first pin is further configured to provide an electronic connection to receive the signal from the media source unit, and the second pin is further configured to provide an electronic connection to charge the media source device.

12. The docking station system of claim 1, wherein the housing further comprises an analog/digital converter configured to convert the signal to either an analog signal or a digital signal for transmission to the unit.

13. The docking station system of claim 1, wherein the received signal is transmitted via a wired network.

14. The docking station system of claim 1, wherein the received signal is transmitted via a powerline network.

15. The docking station system of claim 1, wherein the first transmitter is wireless.

16. The docking station system of claim 15, wherein the first transmitter is RF.

17. The docking station system of claim 15, wherein the first transmitter is IR.

18. The docking station system of claim 15, wherein the first transmitter is Ethernet.

19. An entertainment system comprising:
a housing comprising,
an analog input configured to receive an analog signal from a media source device that is separate from the housing,
a digital input configured to receive a digital signal from the media source device,
a receptacle configured to receive and provide sole support for the media source device, the receptacle having a connector configured to mate with a media connector on the media source device,
a transmitter located proximate to the media source device and configured to transmit the received analog signal and/or received digital signal,
a receiver, and
a power supply configured to power the transmitter and recharge the media source device while the housing is receiving the analog signal and/or digital signal;
a unit located remote from the housing and comprising,
a receiver module configured to receive the transmitted signal, and
a transmitter module configured to transmit the received signal and a first control code, the first control code being transmitted to the receiver of the housing, the housing directly controlling the media source device via the connector based on the first control code; and
a remote playing device configured to receive the signal transmitted by the remote unit,
wherein the media source device is solely coupled to the receptacle while the housing is receiving the analog signal and/or digital signal, and wherein the transmitter is further configured to transmit a second control code to the remote unit, said second control code being associated with the received analog signal and/or received digital signal, and wherein the remote unit is further configured to modify the received signal based on the second control signal.

20. The entertainment system of claim 19, wherein the connection between the transmitter of the housing and the receiver module of the unit located remote from the housing is wired.

21. The entertainment system of claim 20, wherein the connection between the transmitter of the housing and the receiver module of the unit located remote from the housing is powerline.

22. The entertainment system of claim 19, wherein the connection between the transmitter of the housing and the receiver module of the unit located remote from the housing is wireless.

23. The entertainment system of claim 22, wherein the connection between the transmitter of the housing and the receiver module of the unit located remote from the housing is RF.

24. The entertainment system of claim 22, wherein the connection between the transmitter of the housing and the receiver module of the unit located remote from the housing is IR.

25. The entertainment system of claim 22, wherein the connection between the transmitter of the housing and the receiver module of the unit located remote from the housing is Ethernet.

26. A method for distributing audio signals from a hand held device, the method comprising:
receiving a media signal at a docking station from a media source device via a connector configured to mate with the media source device, the docking station providing sole mechanical support and electrical connections for the media source device, the docking station being separate from the media source device;
charging the media source device via the connector;
transmitting the media signal from the docking station and over a first network during a first time frame;
receiving the transmitted media signal at a location remote from the docking station;
providing the received media signal to a remote playing device via a second network;
inputting a first control signal at the remote location;
transmitting the first control signal to the docking station over a third network;
controlling the media source device directly via the connector based on the first control signal;
modifying the media signal based at least in part on the received first control signal;
transmitting the modified media signal to the remote location during a second time frame, the second time frame being after the first time frame;
transmitting a second control code to the remote location, said second control code being associated with the media signal; and
modifying the media signal at the remote location based on the second control signal.

27. The method of claim 26, wherein the media signal comprises an audio signal.

28. The method of claim 26, wherein the media signal comprises a video signal.

29. The method of claim 26, wherein the media signal comprises an audio signal and a control signal associated with the audio signal.

30. The method of claim 26, wherein the first network is a wired network.

31. The method of claim 30, wherein the first network is a powerline network.

32. The method of claim 26, wherein the first network is a wireless network.

33. The method of claim 32, wherein the first network is an RF network.

34. The method of claim 32, wherein the first network is an IR network.

35. The method of claim 26, wherein the first network is an Ethernet network.

36. The method of claim 26, wherein the first and third networks are both wireless networks and the second network is a wired network.

* * * * *

UNITED STATES PATENT AND TRADEMARK OFFICE
CERTIFICATE OF CORRECTION

| | | |
|---|---|---|
| PATENT NO. | : 8,554,045 B2 | Page 1 of 1 |
| APPLICATION NO. | : 11/273616 | |
| DATED | : October 8, 2013 | |
| INVENTOR(S) | : Brooking et al. | |

It is certified that error appears in the above-identified patent and that said Letters Patent is hereby corrected as shown below:

In the Specification:

In column 1 at line 18, Change "and or" to --and/or--.

In column 2 at line 53, Change "powerline." to --powerline;--.

In column 5 at line 5, Change "buss" to --bus--.

In column 7 at line 40, Change "and or" to --and/or--.

In the Claims:

In column 9 at line 7, In Claim 6, change "a" to --using a--.

Signed and Sealed this
Twenty-second Day of July, 2014

Michelle K. Lee
*Deputy Director of the United States Patent and Trademark Office*